United States Patent [19]
Machek

[11] 3,752,536
[45] Aug. 14, 1973

[54] ANTI-SKID MECHANISM
[75] Inventor: John A. Machek, Creve Coeur, Mo.
[73] Assignee: Wagner Electric Corporation, Newark, N.J.
[22] Filed: Nov. 17, 1971
[21] Appl. No.: 199,431

[52] U.S. Cl................................ 303/21 F, 303/11
[51] Int. Cl................................................ B60t 8/06
[58] Field of Search.................. 188/181 A; 303/12, 303/21 F, 21 CE, 21 CF, 21 CG

[56] References Cited
UNITED STATES PATENTS
3,486,800  12/1969  Ayers ............................ 303/21 F
3,523,713  8/1970  Okamoto et al.................. 303/21 F Primary Examiner—Duane A. Reger
Attorney—Joseph E. Papin

[57] ABSTRACT

An anti-lock device for a vehicle brake system is provided with a control valve actuated in response to signals from a sensing mechanism to subject a control member to vacuum and selectively subject said control member to atmosphere for controlling the application of supplied fluid pressure to a vehicle brake, and throttling valve means is provided to control the subjection of said control member to the vacuum.

30 Claims, 6 Drawing Figures

PATENTED AUG 14 1973 3,752,536

ANTI-SKID MECHANISM

FIELD OF THE INVENTION

This invention relates generally to brake systems and in particular to anti-lock devices for use therein.

BACKGROUND OF THE INVENTION

In the past anti-lock brake systems for vehicles, anti-lock devices were provided with a control member which was normally vacuum immersed having one side thereof selectively subjected to atmosphere to establish a driving differential force across said control member and effect the predetermined movement thereof toward a position interrupting fluid pressure communication between a vehicle master cylinder and a brake device and relieving the intensity of the fluid pressure applied to said brake device upon the occurrence of impending vehicle skid conditions. The impending vehicle skid condition was sensed by a sensor device which "looked" at the deceleration of a vehicle wheel during a braking application, and through an electronic logic device, a signal denoting such impending vehicle skid condition was sent to the anti-lock device to effect actuation thereof and relieve the fluid pressure applied from the master cylinder to the vehicle brake. One of the main undesirable or disadvantageous features of such past anti-lock devices is that they created an undesirably long time delay between the sensing of the impending vehicle skid condition and the actuation of said anti-lock device to relieve the fluid pressure applied to the vehicle brake. Another disadvantageous or undesirable feature of such past anti-lock devices was that the time necessary for them to "breathe", i.e. exhaust the atmosphere from the control member to de-actuate the anti-lock device, was inordinately long thereby adding to the aforementioned time delay. And yet another disadvantageous or undesirable feature of such past anti-lock devices was their tendency upon de-actuation to overshoot the pressure at which the impending skid condition was sensed thereby effecting a subsequent application of fluid pressure to the vehicle brake which might further effect a vehicle skid.

The principle object of the present invention is to provide an anti-lock device which overcomes the aforementioned undesirable or disadvantageous features of the past anti-lock devices, and this, as well as other objects, features and advantages of the present invention will be understood from the following description and associated drawings.

SUMMARY OF THE INVENTION

Briefly, the present invention includes an anti-lock device having control means selectively subjected to a differential air-vacuum pressure for controlling the application through said anti-lock device of fluid pressure supplied thereto, and a balanced control valve is actuated by a solenoid to control the selective subjection of said control means to the differential air-vacuum pressure. Another aspect of the present invention includes throttling valve means for snubbing or throttling the evacuation of atmosphere pressure applied to the control means upon the de-actuation of the anti-lock device.

BRIEF DESCRIPTION OF THE DRAWINGS

In the drawings, which illustrate an embodiment of the invention and wherein like numerals refer to like parts wherever they occur.

DESCRIPTION OF THE PREFERRED EMBODIMENT

Figure 1:
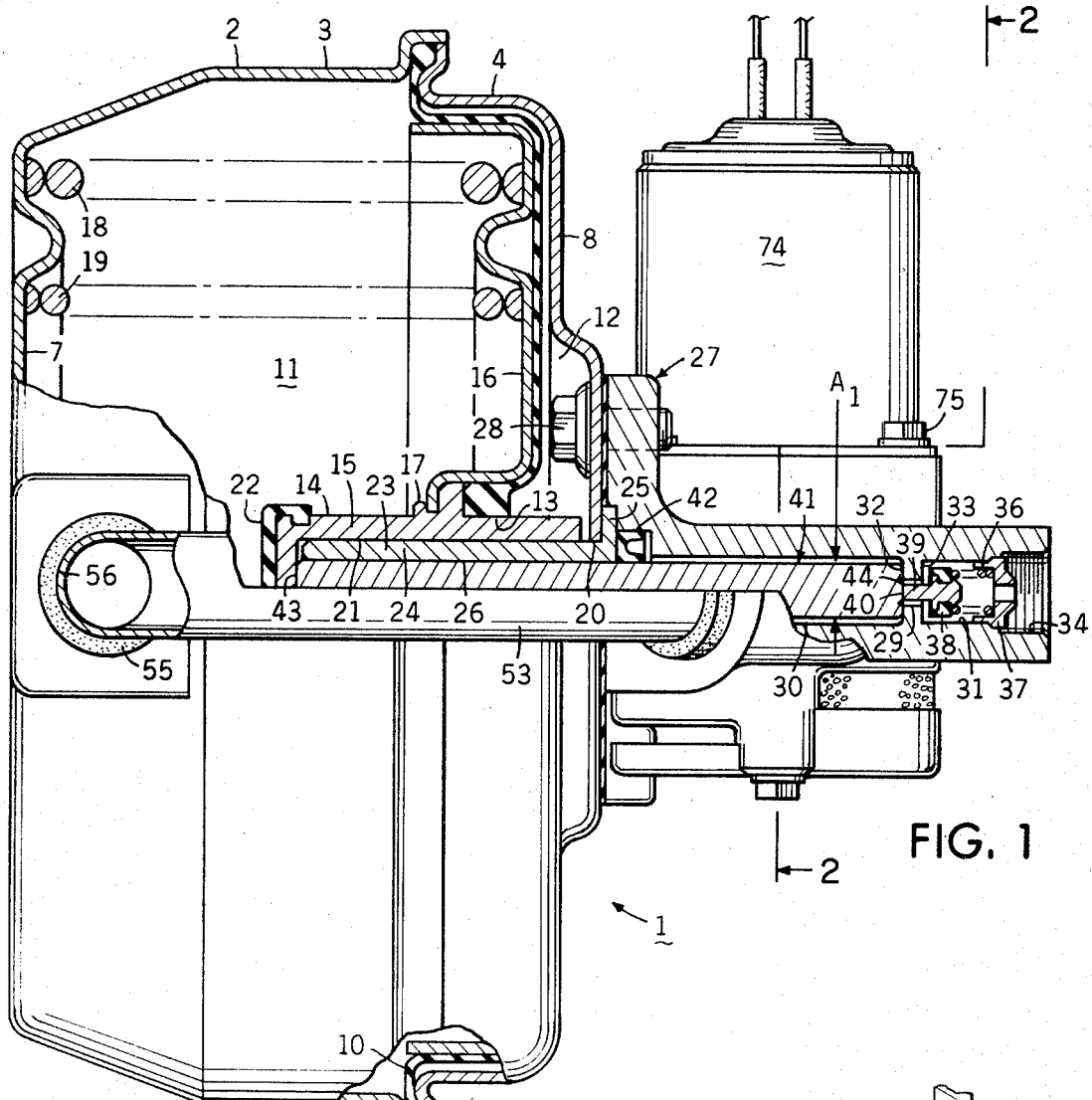
FIG. 1 is a partial sectional view illustrating a preferred embodiment of the present invention partially in cross-section.

Referring now to the drawings in detail and in particular to FIG. 1, an anti-skid or anti-lock device, indicated generally at 1, is provided with a power housing or portion 2 having opposed, generally disc or cop shaped cylinder or housing members 3, 4, and said housing members are provided with opposed peripheral edge portions 5, 6 and opposed base walls 7, 8, respectively. The cylinder members 3, 4 are releasably secured adjacent to their respective opposed peripheral edges 5, 6 by clamping means, such as a plurality of nut and bolt assemblies 9, and an annular diaphragm member 10 is compressed in sealing engagement between said opposed peripheral edges dividing the power housing 2 into opposed vacuum and differential air-vacuum chambers 11, 12 which are respectively defined between the opposed sides of said diaphragm and the base walls 7, 8 of the cylinders 3, 4. The diaphragm 10 is provided with a centrally located aperture 13 which is retained in sealing or clamped engagement between the peripheral surface 14 of a sleeve or driving member 15 and an annular spring retainer 16 fixedly positioned on said driving member peripheral surface by suitable means, such as staking as shown at 17. A pair of concentric springs 18, 19 are respectively precompressed between the retainer 16 and the cylinder base wall 7 urging said retainer, the diaphragm 10 and the driving member 15 rightwardly toward the cylinder base wall 8, and a centrally located aperture 20 is provided through said cylinder base wall 8.

The driving member 15 is provided with an axial blind bore 21 extending through the rightward end thereof substantially coaxial with the cylinder aperture 20, and a resilient bumper 22 is retained on the leftward or closed end of said driving member for engagement with the cylinder base wall 7 to limit the reciprocating axial movement of said driving member, as discussed hereinafter. A guide member 23 is provided with integral sleeve and radially extending flange portions 24, 25, and a bore 26 extends axially through said guide member. The sleeve portion 24 of the guide member 23 extends coaxially through the cylinder aperture 20 into sliding and guiding engagement with the blind bore 21 of the driving member 15, and the flange 25 is abutted in displacement preventing engagement between a control housing 27 and the exterior side of the cylinder base wall 8 about said cylinder aperture therein, said control housing being connected with said cylinder base wall by suitable means, such as a plurality of screws 28.

Figure 2:
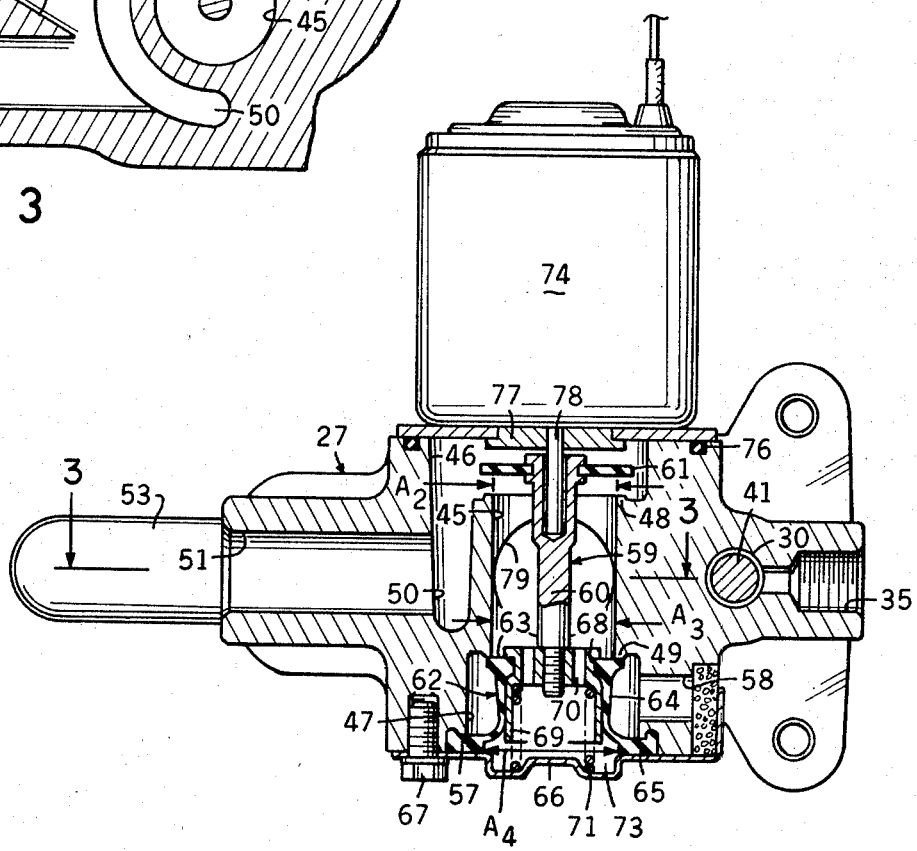
FIG. 2 is a sectional view taken along line 2—2 of FIG. 1.

Referring now to FIGS. 1 and 2, the control housing 27 is provided with a bore 29 axially interposed between counterbores or outlet and inlet chambers 30, 31 and substantially coaxial with the cylinder aperture 20, and opposed annular shoulders 32, 33 are provided on said control housing at the intersections of said bore and counterbores, respectively, said shoulder 33 defining a valve seat. The rightward end of the counterbore 31 defines an inlet port for connection in pressure fluid communication with a fluid pressure generating means, such as a master cylinder or pump or the like (not shown), and an outlet port 35 is provided in the control housing 27 intersecting with the counterbore 30 adjacent to the shoulder 32, said outlet port being adapted for connection in pressure fluid communication with a vehicle brake (not shown). A valve spring 36 is biased between an abutment, such as the hose nipple 37, in the counterbore 31 and a valve member 38 urging said valve member toward engagement with the valve seat 33, and an integral extension 39 is provided on said valve member protruding coaxially through the bore 29 and having a free end portion 40 for abutting engagement with a driven member, such as the control piston 41, in the counterbore 30. The control piston 41 is slidably and guidably received in the bore 26 of the guide member 23 and extends coaxially into the control housing counterbore 30 through an annular sealing member 42 positioned in seating engagement with the guide member flange 25 and in sealing engagement between said control piston and the control housing 27. The sealing engagement of the seal 42 with the control piston 41 defines an effective area $A_1$ on said control piston which is subjected to the applied fluid pressure at the outlet port 35 at all times. Opposed ends 43, 44 are provided on the control piston 41, and the force of the springs 18, 19 acting through the driven member and retainer 15, 16 normally drivingly urges said driven member into abutting engagement with the end 43 of said control piston whereby the other control piston end 44 is normally urged toward engagement with the control housing shoulder 32 and valve member free end 40 to displace the valve member 38 from its cooperating valve seat 33 thereby normally effecting open pressure fluid communication between the inlet and outlet ports 34, 35.

Figure 3:
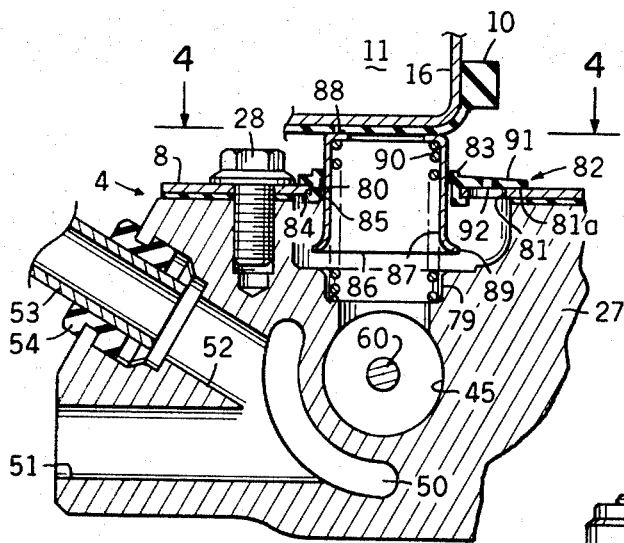
FIG. 3 is a fragmentary sectional view taken along line 3—3 in FIG. 2.

Referring now also to FIG. 3, the control housing 27 is also provided with another bore or delivery chamber 45 interposed between opposed counterbores 46, 47 which respectively defines vacuum and atmospheric chambers, and opposed shoulders 48, 49, which define valve seats, are provided on said control housing at the intersections of said bore with said counterbores, respectively. An arcuate recess 50 is provided in the control housing 27 interconnected between the counterbore 46 and intersecting vacuum and connecting ports 51, 52 in said control housing. The vacuum port 51 is adapted for connection with a vehicle vacuum source (not shown), and a connecting conduit 53 has one end sealably received in the connecting port 52 by suitable means, such as the resilient grommet 54, while the other end thereof is sealably received by suitable means, such as another resilient grommet 55, which is positioned in an aperture 56 provided in the cylinder 3 of the power housing 2; therefore, the power housing vacuum chamber 11 is connected through the connecting port and conduit 52, 53 with the vacuum port 51. An annular valve diaphragm receiving recess 57 is provided in the lower end of the control housing 27 about the counterbore 47, and an air or atmospheric port 58 is provided in said control housing intersecting with said counterbore.

A dumbbell type control valve, indicated generally at 59, is provided with a stem portion 60 which extends substantially coaxially through the bore 45 having opposed valve members 61, 62 thereon in the counterbore 46, 47 for sealing engagement with the valve seats 48, 49, and such sealing engagement between said valve members and seats defining effective areas $A_2$, $A_3$, respectively, as discussed hereinafter. The lower valve member 62 is provided with an upper sealing portion or head 63 which is integrally formed with an annular diaphragm or working portion 64 and a lower annular retainer or sealing portion 65. The retainer portion 65 is disposed in the housing recess 57 in sealing and displacement preventing engagement between the control housing 27 and a retainer or housing closure member 66 which is connected with said housing closing the counterbore 47 by suitable means, such as a plurality of screws 67, and it should be noted that an effective area $A_4$ is defined at the intersection or flexing locus of said diaphragm and retainer portions which is substantially equal to the area $A_3$. The head portion 63 is received in displacement preventing engagement in a peripheral groove 68 of a valve sleeve or insert 69 having axial passage means 70 therethrough and threadedly connected for concerted movement with the lower end of the stem 60. The negligible compressive force of a valve spring 71 biased between the insert 70 and the retainer 66 urges the head portion 63 of the valve 62 into sealing engagement with valve seat 49 thereby isolating the atmospheric chamber 47 which is in communication with the atmospheric port 58 at all times. It should be noted that the valve member 62 defines with the retainer 66 a valve chamber 73 which is within the atmospheric chamber 49 and selectively subjected to either atmosphere or vacuum prevailing in the delivery chamber 45 through the passage means 70 of the valve insert 69 which is connected in communication with the delivery chamber 45 at all times; therefore, since the areas $A_3$, $A_4$ are substantially equal and the valve chamber 73 is subjected to either vacuum or atmosphere prevailing in the delivery chamber 45, then it is apparent that the valve 62 is predeterminately balanced.

An electric solenoid assembly 74 of a type well known in the art is removably secured to the control housing 27 by suitable means, such as a plurality of screws 75, closing the upper end of the control housing counterbore 46, and sealing means 76 is sealably interposed between said control housing and solenoid assembly about the upper end of said counterbore 46. The solenoid 74 is provided with magnetizable pole piece 77 and a shiftable armature member 78 which is drivingly engaged with the upper end of the valve stem 60, said armature member being shiftable to actuate the valve 59 upon energization of said solenoid and magnetization of said pole piece in response to electrical signals of an impending skid condition transmitted to said solenoid from a vehicle wheel speed sensing mechanism and an electrical logic circuit therefor (not shown) as is well known in the art.

Figure 4:
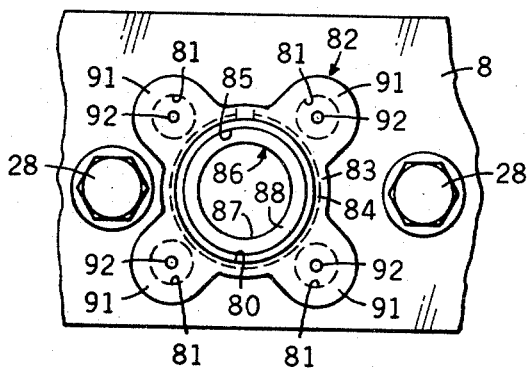
FIG. 4 is a fragmentary view taken along line 4—4 in FIG. 3 illustrating a plan elevation of the throttling valve used in the preferred embodiment of the present invention.

Referring now to FIGS. 3 and 4, the control housing 27 is also provided with a connecting passage means or stepped bore 79 having one end intersecting with the bore 45 adjacent to its mid-portion and the other end thereof connected with the power housing chamber 12 through a large aperture 80 and a plurality of smaller apertures or ports 81 adjacent thereto respectively provided in the base wall 8 of the cylinder 4, and a plurality of valve seats 81a are provided on said base wall about said smaller apertures. A throttling device or mechanism, indicated generally at 82, is provided with a mounting or body portion 83 having an annular groove 84 therein which is received in the cylinder larger aperture 80 in sealing and displacement preventing engagement with the cylinder base wall 8, and a bore or aperture 85 is provided through said throttling mechanism body. A cup or thimble shaped throttling valve element or member 86 having passage means 87 therethrough is slidably and sealably received in the body bore 85, and a valve seat 88 is provided on one end of said throttling valve element about said passage means therethrough for sealing engagement with the diaphragm 10 in the power housing chamber 12. The throttling valve element 86 is also provided with a radially extending flange 89 on the other end thereof within the control housing stepped bores 79 for abutting or displacement preventing engagement with the body 83 about the bore 85 therethrough to predeterminately limit the movement of said throttling valve element with the diaphragm 10, as discussed hereinafter, and the negligible force of a valve spring 90 biased between the control housing 27 and the throttling valve element 86 normally urges the valve seat 88 and the flange 89 toward engagement with the power diaphragm 10 and the body 83. The throttling valve body 83 is also provided with a plurality of integrally formed flapper valves or unidirectional check valves 91 which extend into sealing engagement with the valve seats 81a, and an exhaust throttling passage or restricted reverse flow aperture, such as the orifice 92, is provided in each of said flapper valves to effect restricted communication or flow in the exhausting direction from the chamber 12 to the control housing stepped bores 79.

OPERATION

In the operation and assuming, of course, that the vehicle is operative to establish vacuum at the vacuum port 51, the component parts of the anti-lock device 1 are in their normal or inoperative positions, as shown in the drawings and as described hereinbefore; therefore, the power housing chamber 11 is evacuated through the power housing aperture 56, the connecting conduit 53, the control housing connecting port 52, and said vacuum port, and the power housing chamber 12 is also evacuated through the restricted passages 92 of the throttling mechanism 82, the control housing passage means 79, the bore 45, the counterbore 46, the recess 50 and said vacuum port. With the power housing chambers 11, 12 so evacuated, the compressive forces Fs of the power springs 18, 19 urge the diaphragm 10, retainer 16, and driving member 15 rightwardly in the power housing 2 toward a normal position to drivingly engage said driving member with the control piston end 43 and concertedly urge the control piston 41 rightwardly to abut the rightward end 44 thereof with the control housing shoulder 32 and the free end of the check valve extension 39 thereby displacing the check valve 38 against its spring 36 from its cooperating valve seat 33 to establish open pressure fluid communication between the inlet and outlet ports 34, 35. In this manner, supplied or input fluid pressure from the master cylinder (not shown) flows from the inlet port 35 through the control housing bore 29 and counterbores 30, 31 to the outlet port 35 being applied therefrom to actuate a vehicle brake wheel cylinder and energize a vehicle brake (not shown), and the applied or output fluid pressure at said outlet port acts on the effective area $A_1$ of the control piston 41 to establish a force $F_1$ acting in opposition to the compressive forces of the power springs 18, 19.

When the vehicle brake is so energized, the rate of the vehicle velocity is, of course, decreased, and a sensing device and an electronic circuit (not shown) is utilized to measure the decreasing rate of velocity and ascertain the critical rate thereof denoting impending vehicle skid conditions, such as in the event the applied fluid pressure is great enough to "lock up" the vehicle brake. When the sensing device ascertains such impending vehicle skid condition, a signal is transmitted by the electronic circuit to the solenoid 74 which is then electrically energized to move the control valve 59 downwardly against the negligible force of the spring 71 toward an operative or actuated position engaging the valve member 61 with its valve seat 48 and disengaging the head portion 63 of the valve member 62 from its cooperating valve seat 49. Of course, the engagement of the valve member 61 with the valve seat 48 isolates the bore 45 from the vacuum port 51, and the disengagement of the valve member 62 from the valve seat 49 effects the application or flow of atmospheric air from the atmospheric port 58 through the atmospheric chamber 47 into the valve chamber 71 and the housing bore 49 and passage means 79. The applied atmospheric air initially flows from the passage means 79 through the apertures 81 in the cylinder wall 8 into the power housing chamber 12 displacing the check valves 91 from engagement with their valve seat 81a. The application of atmospheric air in the power housing chamber 12 and the prevailing vacuum in the power housing chamber 11 establishes a differential air-vacuum force $F_2$ acting across the diaphragm 10 in a direction assisting the force $F_1$ acting on the control piston 41 and in opposition to the power spring force Fs. When the forces $F_1$, $F_2$ attain a value great enough to overcome the power spring force Fs, the diaphragm 10 and control piston 41 are concertedly moved very rapidly in a leftward direction toward an operative position initially disengaging the control piston end 40 from the check valve 38, and the check valve spring 36 urges said check valve into sealing engagement with the valve seat 33 interrupting pressure fluid communication between the inlet and outlet ports 34, 35. Upon the interruption of pressure fluid communication between the inlet and outlet ports 34, 35, further leftward movement of the control piston 41 effects volumetric expansion of the control housing outlet chamber 30 reducing the magnitude of the applied fluid pressure at the outlet port 35 which, of course, serves to reduce the intensity of the vehicle brake energization and the vehicle deceleration rate thereby obviating the impending skid condition.

Upon the very rapid, concerted, leftward movement of the diaphragm 10 and control piston 41 in response to the forces $F_1$, $F_2$ acting against the spring force $Fs$, the negligible force of the spring 90 concertedly moves the throttling valve member 86 with said diaphragm through a predetermined distance until the flange 89 of said throttling valve member becomes abutted with the throttling member body 83 about the bore 85 therethrough, and thereafter further leftward movement of said diaphragm effects the disengagement thereof from the valve seat 88 on said throttling valve member to open the passage means 87 and permit applied and exhausting passage of atmospheric air therethrough between the control housing passage means 79 and the power housing chamber 12. It should be noted that the passage of the applied atmospheric air through the housing apertures 81 is substantially unrestricted to insure rapid translatory movement of the diaphragm 10 and control piston 41 in the leftward direction in order to very quickly alleviate or reduce the applied fluid pressure at the outlet port 35 to obviate the impending skid condition. Of course, the concerted leftward movement of the diaphragm 10 and control piston 41 is ultimately limited by the engagement of the driven member bumper 22 with the rear or end wall 7 of the power housing 2.

The aforementioned increase in the rate of vehicle velocity in response to the reduction of the applied fluid pressure is, of course, sensed by the sensing means which ascertains that the danger of a vehicle skid is now past, and another signal is now transmitted by the electronic circuit to the solenoid 74 which effects de-energization thereof. Upon the de-energization of the solenoid 74, the force of the air-vacuum differential acting across the area $A_2$ of the valve member 61 assisted by the valve return spring 71 urges the control valve 59 upwardly toward its normal position reengaging the valve member 62 with its valve seat 49 and again disengaging the valve member 61 from its valve seat 48 to selectively interrupt pressure fluid communication between the atmospheric port 58 and the power housing chamber 12 and selectively reestablish communication between said power housing chamber and the vacuum port 51. Upon the re-establishment of communication between the vacuum port 51 and power housing chamber 12, the atmospheric air is initially exhausted from said power housing chamber passing through the passage 87 in the throttling valve member 86, the control housing stepped passage 79, the bore 45, the counterbore 46, and the recess 50 to the vacuum port 51, and in this manner, the differential force $F_2$ acting across the diaphragm 10 is correspondingly reduced. Upon the initial reduction of the differential force $F_2$, the opposing power spring force $Fs$ effects an initial, very rapid, concerted movement of the diaphragm 10 and control piston 41 rightwardly toward their original positions until said diaphragm re-engages the valve seat 88 on the throttling valve member 86 to again close the passage means 87 therethrough. When the throttling valve member passage means 87 is closed, the differential of the partially exhausted atmospheric air in the power housing chamber 12 as compared with the vacuum being created in the control cylinder passage 79 acts across the flapper valves 91 of the throttling mechanism body 83 urging them toward sealing engagement with their valve seats 81a. Thereafter, further evacuation or exhausting flow of the atmospheric air from the power housing chamber 12 is effected only through the restricted orifices 92 in the flapper valves 91 which dampens or reduces the speed of the terminal portion of the concerted rightward movement of the diaphragm 10 and control piston 41 toward their original positions. Of course, when all of the atmospheric air is so evacuated from the power housing chamber 12, the differential force $F_2$ is eliminated and the power spring force $Fs$ then concertedly drives the diaphragm 10, the control piston and the throttling member 86 to their original positions re-engaging the control piston end 44 with the housing shoulder 32 and the check valve 38 from its valve seat 33 and re-establish pressure fluid communication between the inlet and outlet ports 34, 35. Of course, the initial, very rapid, rightward movement of the control piston 41 in the control housing counterbore 30 effects a very rapid re-establishment of the magnitude of the applied fluid pressure at the outlet port 35 to approximately that magnitude when an impending skid condition was originally sensed to again increase the intensity of the vehicle brake energization resulting in a corresponding vehicle velocity rate decrease to again cause the sensing device to signal for the energization of the solenoid 74. Of course, the terminal portion of the translatory rightward movement of the diaphragm 10 and control piston 41 is snubbed or damped, as mentioned hereinbefore, in order to maintain the vehicle deceleration substantially constant at a higher rate for a longer period of time which prevents overshooting of the pressure at which the original impending skid condition was sensed upon the subsequent re-establishment of the pressure at the outlet port 35 to re-energize the vehicle brakes.

It should be noted that the magnetic or operating characteristics of solenoids, such as the solenoid 74, require an extremely high exciting current to energize the armature 78 and effect initial actuation thereof, as compared for instance with the current necessary to maintain said armature in its energized position in magnetic holding engagement (not shown) with its pole piece 77. In other words, once the armature 78 is magnetically urged downwardly or toward engagement with the pole piece 77, the current necessary to maintain such magnetic holding engagement is appreciably less than that needed to excite or initiate the movement of said armature toward said pole piece, and this characteristic is, in the most part, due to the air gap between said armature and pole piece. Therefore, since the exciting current is extremely high, it is desirable to balance the forces acting across the control valve 59 in its original position, as shown, so that the exciting current acting on armature 78 to effect the initial actuation thereof toward magnetic holding engagement with the pole piece 77 is opposed only by the negligible force of the valve return spring 71. In the normal operating position of the control valve 59, it should be noted that the valve chamber 73 is exhausted through the valve passage means 70 to the control housing bore 45; therefore, since the opposing areas $A_3$, $A_4$ are substantially equal and subjected to vacuum in said control housing bore and said valve chamber, it is apparent that any forces acting on the valve member 62 are equal and opposite, thereby self-cancelling, wherein said valve member 62 and the control valve 59 are balanced in the normal operating positions thereof. Of course, with the control valve 59 so balanced in its original or normal operating position, it is apparent that smaller electrical coils (not shown) can be employed in the solenoid 74 to actuate the armature 78 and the control valve 59 since the forces opposing the solenoid exciting current are predeterminately minimized.

When the solenoid 74 is energized as previously discussed, the armature 78 is moved downwardly toward magnetic holding engagement with the pole piece 77 to actuate the control valve 59 to its operative position against only the negligible force of its return spring 77 thereby engaging the valve member 61 with its seat 48 to isolate the control housing bore from vacuum and disengaging the valve member 62 from its seat to subject said control housing bore to atmosphere. With the control valve 59 in its operating position, the valve chamber 71 is subjected through the valve passage 70 to the prevailing atmosphere in the control housing bore 45, and since the areas $A_3$, $A_4$ are equal, as previously mentioned, the forces acting across the valve member 62 are also balanced in the open or operative position thereof. Of course, the atmosphere and vacuum prevailing in the control housing bore and counterbore 45, 46 respectively acting on area $A_2$ of the valve member 61 when it is engaged with the valve seat 48 establishes a differential force acting against the force of the magnetic holding engagement of the armature 78 with the pole piece 77; however, as previously mentioned, the current necessary to maintain the magnetic holding engagement between said armature and pole piece is appreciably less than that necessary to excite said armature toward such magnetic holding engagement with said pole piece.

Figures 5, 6:
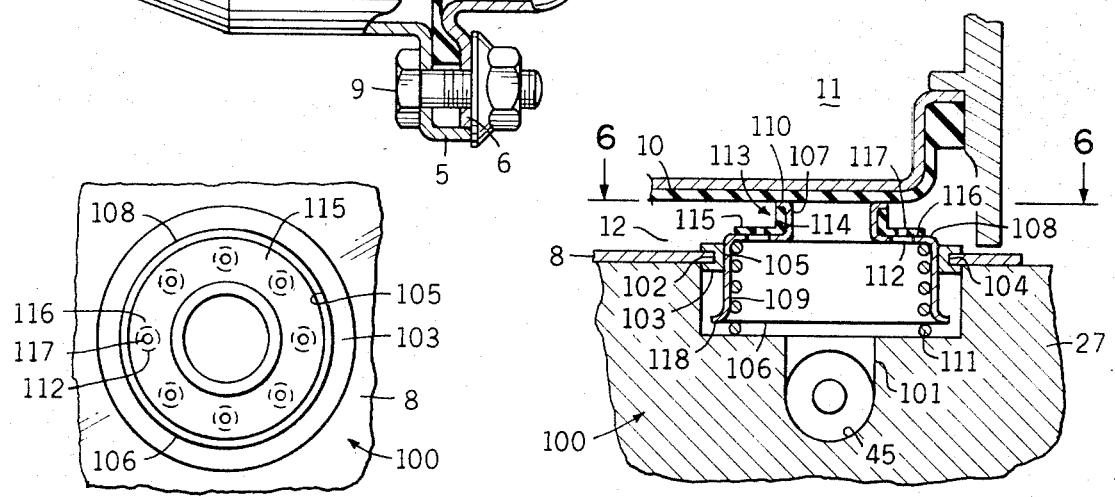
FIG. 5 is a fragmentary sectional view illustrating an alternate construction of a throttling device for use in the present invention in cross-section.
FIG. 6 is a fragmentary view taken along line 6—6 in FIG. 5 illustrating a plan elevation of the alternate throttling device.

Referring now to FIGS. 5 and 6, an alternative construction of a throttling device, indicated generally at 100, is shown for use in the anti-lock device 1 having substantially the same component parts and functioning in substantially the same manner as the previously described throttling device 82 with the following exceptions.

The housing 27 is provided with a connecting passage means or stepped bore 101 having one end intersecting with the bore 45 adjacent to its mid-portion and the other end thereof connected with the power housing chamber 12 through an aperture 102 provided in the base wall 8 of the cylinder 4. The throttling device or mechanism 100 is provided with a mounting portion or grommet 103 having an annular peripheral groove 104 therein which is received in the aperture 102 in sealing and displacement preventing engagement with the cylinder base wall 8, and a bore or aperture 105 is provided through said grommet. A throttling valve element or member, such as the stepped piston 106, is slidably received in the grommet bore 105 having a reduced portion or extension 107 extending into the power housing chamber 12 and defining with said piston a shoulder 108 thereon. A stepped bore or passage 109 is provided through the throttling valve member 106, and a valve seat 110 is provided on the extension 107 about said passage 109 for sealing engagement with the diaphragm 10 in the power housing chamber 12, said valve seat being urged into sealing engagement with said diaphragm by the negligible force of a valve return spring 111 engaged between said throttling valve member and the housing 27. The throttling valve member 106 is also provided with a plurality of aperture or passages 112 extending through the shoulder 108 between the throttling valve member stepped bore 109 and the power housing chamber 12, and a flapper valve or uni-directional valve means 13 is provided to permit the passage of atmosphere through said apertures 112 only in the direction from said throttling valve bore into said power housing chamber. The uni-directional check valve 113 is provided with an axially extending collar portion 114 which is received in displacement preventing engagement on the periphery of the throttling valve extension 107, and an annular flapper or valve portion 115 is integrally formed with said collar 114 extending radially therefrom into sealing engagement with a plurality or valve seats 116 defined on the shoulder 108 about the aperture 112 therethrough. A plurality of exhausting throttling passages or restricted reverse flow passages, such as the orifices 117, are provided through the flapper valve 115 in alignment with the apertures 112 to effect only restricted communication or exhausting atmospheric air flow therethrough in the exhausting direction from the power housing chamber 12 to the throttling valve stepped bore 109. To complete the description of the throttling device 100, the throttling valve member 106 is also provided with a radially extending flange 118 within the control housing stepped bore 101 for abutting or displacement preventing engagement with the grommet 103 to predeterminately limit the movement of said throttling valve member with the diaphragm 10 in excess of a predetermined amount.

Upon the energization of the solenoid 74 in response to preselected conditions to actuate the control valve 59 and effect the passage of atmosphere into the delivery chamber 45, as previously discussed, the atmosphere flows therefrom through the housing passage 101 and the throttling valve bore 109 and apertures 112 into the power housing chamber 12 displacing the uni-directional valve means 113 from its cooperating valve seats 116. The establishment of atmospheric air in the power housing chamber 12 and the prevailing vacuum in the power housing chamber 11 creates the differential air-vacuum force $F_2$ across the diaphragm 10 to effect the movement thereof toward its operative position assisted by the force $F_1$ against the spring force $Fs$, and the valve spring 111 urges the throttling valve member 106 in concerted movement with said diaphragm through the predetermined amount until the flange 118 abuttingly engages the grommet 103 thereby containing said valve spring. Upon the engagement of the flange 118 with the grommet 103, further movement of the diaphragm 10 in response to the differential force $F_2$ effects the disengagement of said diaphragm from the valve seat 110 of said throttling valve member opening the bore 109 thereof to permit the ingress and egress of the atmospheric air therethrough to and from the power housing chamber 12.

Upon the subsequent de-energization of the solenoid 74 in response to preselected conditions to de-actuate the control valve 59 and effect the exhaustion of the applied atmospheric air from the power housing chamber 12, as previously discussed, the exhausting atmosphere, of course, urges the uni-directional valve means 113 into engagement with its valve seats 116 and initially flows from said power housing chamber through the throttling valve member bore 109, the control housing bore 101, and the delivery and vacuum chambers 79, 46 of the control housing 27. This evacuation of the atmospheric air from the power housing chamber effects a corresponding reduction of the differential force $F_2$ acting across the diaphragm 10 wherein the spring force Fs thereafter very rapidly moves said diaphragm toward its original position and into re-engagement with the valve seat 110 of the valve seat 110 of the throttling valve member 106. Upon the re-engagement of the diaphragm 10 with the throttling member valve seat 110, the throttling member bore 109 is closed interrupting pressure fluid communication therethrough between the power housing chamber 12 and the control housing stepped passage 101 which, in effect, damps or snubs the movement of said diaphragm toward its original position in response to the spring force Fs; however, such damped movement of said diaphragm is thereafter controllably effected by the exhausting passage of the remaining atmospheric air from said power housing chamber through the restricted orifices 117 and throttling member apertures 105 to said throttling member bore. When the exhausting passage of the atmospheric air from the power housing chamber 12 is completed, the differential force $F_2$ is eliminated, and the spring force Fs urges the diaphragm 10 and component parts connected therewith to their original positions as previously described and as shown in the drawings. In this manner, it is obvious that the atmospheric air is quickly applied to the power housing chamber 12 through the throttling member apertures 105 to effect a very rapid movement of the diaphragm 10 against the springs 18, 19 toward its operative position permitting the control piston 41 to very rapidly relieve the applied fluid pressure at the brakes (not shown), and the exhausting flow of atmospheric air from said power housing chamber is quickly accomplished through the throttling member bore 109 to effect an initial very rapid return movement of said diaphragm toward its original position to drive said control piston thereby very rapidly reestablishing the applied fluid pressure at said brakes; however, the terminal portion of such return movement is snubbed or damped by the engagement of said diaphragm with the throttling member valve seat 110 and the subsequent exhaustion of atmospheric air through the orifices 117 in order to maintain the vehicle deceleration substantially constant at a higher rate for a longer period of time which prevents overshooting of the pressure at which the original impending skid condition was sensed upon the subsequent re-establishment of the applied fluid pressure to re-energize the vehicle brakes.

From the foregoing, it is now apparent that a novel anti-lock device 1, as well as a novel control valve 27 and novel throttling devices 82, 100 therefor, meeting the objects and advantageous features set forth hereinbefore, as well as others, is provided and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. An anti-lock device comprising a housing, means movable in said housing for controlling the application therethrough of supplied fluid pressure, resiliently urged means movable in said housing between opposed positions and drivingly engaged with said first named means in one of said positions to effect the application through said housing of the supplied fluid pressure, said resiliently urged means defining with said housing a pair of opposed expansible chambers, control means normally subjecting one of said chambers to vacuum and actuated upon the occurrence of preselected conditions for selectively applying and exhausting atmosphere to and from the other of said chambers, means in said housing defining passage means between said control means and said other chamber for the passage therethrough of the applied and exhausting atmosphere, said resiliently urged means being movable against its own force from its one position toward the other of its positions upon the selective application of atmosphere to said other chamber and said first named means being thereafter movable in response to the applied fluid pressure acting thereon toward following engagement with said resiliently urged means to isolate the applied fluid pressure and effect a reduction in the magnitude thereof, and throttling means in said passage means for controlling the passage therethrough of the atmosphere applied to and exhausting from said other chamber including uni-directional valve means for passing the applied atmosphere only from said passage means into said other chamber to act on said resiliently urged means and initiate movement thereof toward its other position, other valve means engaged with said resiliently urged means in its one position and disengaged therefrom upon the movement of said resiliently urged means in excess of a predetermined amount toward its other position including means for passing both applied and exhausting atmosphere between said passage means and said other chamber when said other valve means is disengaged from said resiliently urged means, and orifice means in said uni-directional valve means for the restricted passage of exhausting atmosphere only from said other chamber to said passage means to damp the movement of said resiliently urged means toward its one position when said other valve means is engaged therewith.

2. An anti-lock device according to claim 1, comprising a valve seat on said other valve means about said included means for engagement with said resiliently urged means, said valve seat being engaged with said resiliently urged means in its one opposed position to preclude passage of applied and exhausting atmosphere to and from said other chamber through said included means and being disengaged from said resiliently urged means upon the movement thereof in excess of the predetermined amount toward its other position to effect the passage of applied and exhausting atmosphere to and from said other chamber through said included means.

3. An anti-lock device according to claim 2, wherein said included means comprises other passage means extending through said other valve means between said other chamber and said first named passage means.

4. An anti-lock device according to claim 1, comprising resilient menas urging said other valve means toward engagement with said resiliently urged means, and means for predeterminately limiting the movement of said other valve means in response to the force of said resilient means with said resiliently urged means in excess of the predetermined amount toward its other opposed position to effect the disengagement of said other valve means from said resiliently urged means.

5. An anti-lock device according to claim 1, wherein said included means comprises other passage means extending through said other valve means between said other chamber and said first named passage means, a value seat on said other valve means about said other passage means for engagement with said resiliently urged means, spring means engaged with said other valve means urging said valve seat toward engagement with said resiliently urged means in its one position to close said other passage means, and means for containing the force of said spring means and limiting the movement of said other valve means in response to the force of said spring means with said resiliently urged means in excess of the predetermined amount toward its other position, said valve seat being disengaged from said resiliently urged means to open said other passage means and effect the passage therethrough of both applied and exhausting atmosphere between said other chamber and said first named passage means upon the movement of said resiliently urged means in excess of the predetermined amount toward its other position.

6. An anti-lock device according to claim 5, wherein said first named means includes aperture means in said housing, said other valve means being movable in said aperture means, said last named means including flange means on said other valve means predeterminately spaced from said housing about said aperture means for engagement therewith when said other valve means is engaged with said resiliently urged means in its one opposed position, said flange means being movable with said other valve means into engagement with said housing about said aperture means to contain the force of said spring means and arrest the movement of said other valve means with said resiliently urged means in excess of the predetermined amount toward its other position.

7. An anti-lock device according to claim 6, wherein said other valve means includes piston means movable in said aperture means and having opposed end portions, one of said end portions being within said other chamber and the other of said end portions being within said first named passage means, said other passage means being in said piston means and intersecting with said opposed end portions thereof, said valve seat being on said one end portion about said other passage means, and said flange means being connected with said piston means adjacent to said other end thereof.

8. An anti-lock device according to claim 1, wherein said throttling device includes mounting means connected with said housing between said passage means and other chamber, said uni-directional valve means being connected with said mounting means, and said other valve means being movable in said mounting means.

9. An anti-lock device according to claim 8, wherein said passage means include aperture means in said housing and connected with said other chamber, valve seating means on said housing about said aperture means and within said other chamber for engagement with said unidirectional valve means, said uni-directional valve means being movable toward a position disengaged from said valve seating means in response to the applied atmosphere in said passage means acting thereon to open said aperture means and permit only the passage of applied atmosphere therethrough into said other chamber and said uni-directional valve means being urged toward engagement with said valve seating means to close said aperture means in response to the exhausting atmosphere acting thereon.

10. An anti-lock device according to claim 8, wherein said passage means includes first and second aperture means in said housing connected between said control means and said other chamber, said mounting means including a portion sealably engaged with said housing about one of said first and second aperture means, a bore in said mounting means between said passage means and said other chamber, said other valve means being movable in said bore, said uni-directional valve means being disposed within said other chamber to permit only the passage of applied atmosphere through the other of said first and second aperture means into said other chamber, and said orifice means being aligned with said other of said first and second aperture means.

11. An anti-lock device according to claim 10, comprising valve seating means on said housing about said other of said first and second aperture means and within said other chamber for engagement with said uni-directional valve means, said uni-directional valve means being movable toward a position disengaged from said valve seating means in response to applied atmosphere acting thereon in said passage means to open said other of said first and second aperture means permitting only the passage therethrough of the applied atmosphere into said other chamber and said unidirectional valve means being urged into engagement with said other valve means to close said other of said first and second aperture means in response to the exhausting atmosphere in said passage means acting on said unidirectional valve means.

12. An anti-lock device according to claim 11, comprising other valve seating means on said other valve means about said included means and within said other chamber for engagement with said resiliently urged means, said other valve seating means being engaged with said resiliently urged means in its one position to preclude the passage of both applied and exhausting atmosphere through said included means into and from said other chamber being disengaged from said resiliently urged means upon the movement thereof in excess of the predetermined amount toward its other position to effect the passage of both applied and exhausting atmosphere into and from said chamber through said included means.

13. An anti-lock device according to claim 12, wherein said included means comprises other passage means extending through said other valve means between said other chamber and said first named passage means, said other valve seating means being on said other valve means about said other passage means and within said other chamber.

14. An anti-lock device according to claim 11, comprising resilient means engaged with said other valve means and urging said other valve means toward engagement with said resiliently urged means, and means for containing the force of said resilient means and limiting the movement of said other valve means in excess of the predetermined amount with said resiliently urged means toward its other position to effect the disengagement of said other valve means from said resiliently urged means.

15. An anti-lock device according to claim 11, wherein said included means comprises other passage means extending through said other valve means between said other chamber and said first named passage means, other valve seating means on said other valve means about said other passage means and within said other chamber for engagement with said resiliently urged means, spring means engaged with said other valve means urging said other valve seating means toward engagement with said resiliently urged means in its one position to close said other passage means, and means for containing the force of said spring means and limiting the movement of said other valve means to the predetermined amount with said resiliently urged means toward its other position, said other valve seating means being disengaged from said resiliently urged means to open said other passage means upon the movement of said resiliently urged means in excess of the predetermined amount toward its other position.

16. An anti-lock device according to claim 15, wherein said last named means includes flange means integral with said other valve means and predeterminately spaced from said mounting means for engagement therewith when said other valve means is engaged with said resiliently urged means in its one position, said flange means being movable with said other valve means into engagement with said mounting means to contain the force of said spring means and arrest the movement of said other valve means in excess of the predetermined amount with said resiliently urged means toward its one position.

17. An anti-lock device according to claim 16, wherein said other valve means includes piston means slidable in said bore and having opposed end portions, one of said end portions being in said other chamber and the other of said end portions being in said first named passage means, said other passage means being in said piston means and intersecting with said opposed end portions thereof, respectively, said other valve seating means being on said one end portion about said other passage means and within said other chamber, and said flange means extending radially outwardly of said piston means and being connected with said piston means adjacent to said other end portions thereof.

18. An anti-lock device according to claim 1, comprising atmospheric, vacuum and delivery chambers in said housing, said delivery chamber being connected with said passage means, said control means including control valve means movable in said housing for controlling communication between said atmospheric, vacuum and delivery chambers, said control valve means being movable in response to an applied force thereon between one position isolating said atmospheric chamber and communicating said vacuum and delivery chambers to effect the passage of exhausting atmosphere from said other chamber through said passage means toward another position isolating said vacuum chamber and communicating said atmospheric and delivery chambers to effect the passage of applied atmosphere through said passage means to said other chamber, said control valve means including other means defining with said housing a valve chamber within said atmospheric chamber and isolated therefrom, a pair of opposed and substantially equal effective areas on said other included means for subjection to the applied and exhausting atmosphere in said delivery chamber at all times, and valve passage means in said other included means communicating said valve chamber with said delivery chamber.

19. An anti-lock device according to claim 18, comprising means on said other included means defining in said valve chamber one of said areas.

20. An anti-lock device according to claim 18, comprising a valve seat on said housing between said delivery and atmospheric chambers for engagement with said other included means when said control valve means is in its one position, the sealing engagement of said other included means with said valve seat defining one of said areas.

21. An anti-lock device according to claim 18, comprising means on said other included means defining in said valve chamber one of said areas, and a valve seat on said housing between said delivery and atmospheric chambers for engagement with said other included means when said control valve means is in its one position, the sealing engagement of said other included means and valve seat defining the other of said areas.

22. An anti-lock device according to claim 18, comprising a valve seat on said housing between said delivery and atmospheric chambers, said other included means including a valve portion for sealing engagement with said valve seat and defining therewith one of said areas, a sealing portion connected in sealing and displacement preventing engagement with said housing, and diaphragm means between said valve and sealing portions and defining therewith the other of said areas within said valve chamber, and said valve passage means extending through said valve portion to communicate said delivery and valve chambers.

23. An anti-lock device according to claim 22, comprising resilient means within said valve chamber engaged between said valve portion and housing and normally urging said valve portion into sealing engagement with said valve seat.

24. An anti-lock device according to claim 22, comprising another valve seat on said housing between said vacuum and delivery chambers, said control valve means including a valve member for engagement with said other valve seat and connected for concerted movement with said other included means, and resilient means engaged with said control valve means normally urging said valve portion into engagement with said first named valve seat isolating said atmospheric chamber and urging said valve member toward a position disengaged from said other valve seat to communicate said vacuum and delivery chambers, said control valve means being movable in response to the applied force thereon toward its other position against said resilient means to engage said valve member with said other valve seat and disengage said valve portion from said first named valve seat.

25. An anti-lock device according to claim 24, comprising another pair of opposed substantially equal effective areas on said valve member, one area of said other area pairs being subjected to the atmosphere in said delivery chamber and the other area of said other area pairs being subjected to the vacuum in said vacuum chamber to establish a differential force acting across said valve member and assisting said resilient means to return said valve means to its one position when it is in its other position.

26. An anti-lock device according to claim 24, comprising electric solenoid means connected with said control valve means and energized in response to the preselected conditions to exert the applied force for moving said control valve means to its other position.

27. An anti-lock device according to claim 25, comprising electric solenoid means in said housing drivingly connected with said control valve member and energized in response to the preselected conditions to drive said control valve member to its other position and concertedly move said valve member and valve portion toward engagement with said other valve seat and disengagement from said first named valve seat, respectively.

28. An anti-lock device according to claim 24, wherein said control valve means includes a sleeve portion extending substantially coaxially through said valve portion, and means connected between said valve portion and sleeve portion in displacement preventing engagement, said valve passage means being within said sleeve portion connecting said delivery and valve chambers in communication, and connecting means between said sleeve portion and valve member to effect the concerted movement thereof in response to the applied force.

29. An anti-lock device according to claim 1, comprising atmospheric and vacuum ports in said housing for selective connection in communication with said passage means, said control means including control valve means movable in said housing between one position isolating said atmosphere port and connecting said vacuum port in communication with said passage means and another position isolating said vacuum port and connecting said atmospheric port in communication with said passage means, the vacuum and atmosphere at said vacuum and atmospheric ports acting on said control valve means to establish a force urging said control valve means toward its one position when said control valve means is in its other position and said force being eliminated upon movement of said control valve means to its one position, a valve seat on said housing between said atmospheric port and said passage means, said control valve means including a sleeve member, and an annular resilient member connected with said sleeve member, said resilient member including a valve portion for seating engagement with said valve seat and defining therewith an effective area for subjection to the vacuum and atmosphere in said passage means, a sealing portion connected in sealing and displacement preventing engagement with said housing, and diaphragm means integrally connected between said valve portion and sealing portion, said sleeve member and resilient member defining with said housing a valve chamber, said resilient member including means defining another effective area in said valve chamber and opposed to said first named area, said valve passage means extending through said sleeve member and connecting said valve chamber in communication with said passage means, and spring means urging said control valve means toward its one position.

30. An anti-lock device for use in a vehicle brake system comprising a housing having inlet, outlet, vacuum and atmospheric ports therein adapted for connection with a fluid pressure source, a vehicle brake, a vacuum source and the atmosphere, respectively, a first valve seat in said housing between said inlet and outlet ports, first valve means movable in said housing for engagement with said first valve seat, first resilient means urging said first valve means toward engagement with said first valve seat, first piston means movable in said housing and defining therewith an expansible fluid pressure outlet chamber connected in communication with said outlet port, a driving end on said piston means for engagement with said first valve means, second piston means movable in said housing between opposed operating positions for driving engagement with said first piston means in one of said operating positions, said second piston means defining with said housing a pair of opposed expansible chambers, second resilient means in one of said opposed chambers and engaged with said second piston means, the force of said second resilient means urging said second piston means toward its one operating position in driving engagement with said first piston means to engage said driving end thereof with said first valve means and normally urge said first valve means against said first resilient means toward a position disengaged from said first valve seat establishing pressure fluid communication between said inlet and outlet ports, first passage means in said housing for selective subjection to the vacuum and atmosphere at said vacuum and atmospheric ports including first and second aperture means connected with the other of said opposed chambers, second and third valve seats in said housing between said passage means and said vacuum and atmospheric ports, respectively, second and third valve means connected for concerted movement in said housing for engagement with said second and third valve seats, respectively, third resilient means normally urging said second and third valve means toward a normal position disengaged from and engaged with said second and third valve seats to communicate said passage means with said vacuum port and isolate said passage means from said atmospheric port, respectively, means for connecting said one opposed chamber with said vacuum port at all times, electric solenoid means in said housing for energization in response to preselected conditions and for driving engagement with said second and third valve means, said solenoid means being energized upon the occurrence of the preselected conditions to drive said second valve means toward an actuated position engaged with said second valve seat to isolate said vacuum port from said passage means and to concertedly drive said third valve means with said second valve means toward an actuated position disengaged from said third valve seat to communicate said atmospheric port and said passage means effecting the application therethrough of atmosphere into said other opposed chamber, said second piston means being movable from its one operating position toward the other of its operating positions against the force of said second resilient means in response to a differential force established between the vacuum and selectively applied atmosphere in said opposed chambers acting across said second piston means upon the energization of said solenoid means and the concerted actuation of said second and third valve means, a first effective area on said first piston means in said outlet chamber and subjected to the established fluid pressure at said outlet port, said first piston means being initially movable toward following engagement with said second piston means upon movement thereof toward its other operating position to disengage said driving end from said first valve means and effect the movement thereof into engagement with said first valve seat in response to the force of said first resilient means isolating said inlet and outlet ports and said first piston means also being thereafter further movable toward following engagement with said second piston means in its other operating position to effect volumetric expansion of said outlet chamber and a corresponding reduction of the established fluid pressure at said outlet port, second and third opposed and substantially equal effective areas on said second valve means for subjection to the vacuum at said vacuum port and for subjection to the vacuum and atmosphere at said vacuum and atmospheric ports when said second and third valve means are in their normal and actuated positions, respectively, the atmosphere at said atmospheric port acting on said second area and the vacuum at said vacuum port acting on said third area when said second and third valve means are in their actuated positions to establish another differential force acting across said second valve means additive to the force of said third resilient means and urging said second and third valve means toward their normal positions, said third valve means defining with said housing a valve chamber and including a sleeve member connected with said second valve means, a valve portion for engagement with said third valve seat and connected with said sleeve portion, a fourth effective area on said valve portion subjected to the vacuum and atmosphere in said passage means, a sealing portion connected in sealing and displacement preventing engagement with said housing, diaphragm means connected between said valve and sealing portions, second passage means in said sleeve member connecting said valve chamber in communication with the vacuum and atmosphere in said first passage means, a fifth effective area on said third valve means within said valve chamber opposed and substantially equal to said fourth area and subjected to the vacuum and atmosphere in said first passage means and in said valve chamber, respectively, a throttling device in said first passage means for controlling the passage therethrough of the atmosphere applied to said other opposed chamber when said second and third valve means are in their actuated positions and the atmosphere exhausting from said other opposed chambers when said second and third valve means are in their normal positions, respectively, including mounting means disposed in sealing and displacement preventing engagement with said housing about said first aperture means, a bore in said mounting means between said other opposed chamber and said first passage means, third piston means movable in said bore and having opposed end portions thereon, one of said opposed end portions being in said other opposed chamber and the other of said opposed ends being in said first passage means, a third passage means in said third piston means intersecting with said opposed end portions thereof, a fourth valve seat on said one end portion about said third passage means for engagement with said third piston means in its one operating position, fourth resilient means engaged with said third piston means urging said fourth valve seat toward engagement with said second piston means, and flange means on said third piston means adjacent to the other end portion thereof for engagement with said mounting means and predeterminately spaced therefrom when said second piston means is in its one operating position, the force of said fourth resilient means initially urging said third piston means in concert with said second piston means upon the movement thereof toward its other operating position and said second piston means being disengaged from said fourth valve seat to open said third passage means and effect the passage of applied and exhausting atmosphere therethrough upon the engagement of said flange means with said mounting means, a fifth valve seat in said housing about said second aperture means and within said other opposed chamber, uni-directional valve means on said mounting means for engagement with said fifth valve seat, said uni-directional valve means being movable in response to applied atmosphere in said first passage means acting thereon toward a position disengaged from said fifth valve seat to effect the passage of the applied atmosphere through said second aperture means only into said other opposed chamber to initiate the movement of said second piston means toward its other operating position prior to the disengagement thereof from said fourth valve seat, and orifice means in said uni-directional valve means for the restricted passage of exhausting atmosphere only from said other opposed chamber to said first passage means to damp the movement of said second piston means in response to the force of said second resilient means toward its one operating position when said fourth valve means is engaged with said second piston means closing said third passage means.

* * * * *

UNITED STATES PATENT OFFICE
CERTIFICATE OF CORRECTION

Patent No. 3,752,536　　　　　　　Dated August 14, 1973

Inventor(s) John A. Machek

It is certified that error appears in the above-identified patent and that said Letters Patent are hereby corrected as shown below:

Column 2, line 30, "cop" should read -- cup --. Column 6, line 10, "35" should read -- 34 --. Column 10, line 5, "13" should read -- 113 --. Column 11, line 8, delete "valve seat 110 of the".

Signed and sealed this 21st day of May 1974.

(SEAL)
Attest:

EDWARD M. FLETCHER, JR.　　　　　C. MARSHALL DANN
Attesting Officer　　　　　　　　Commissioner of Patents